A. C. SWEETLAND.
Pipe-Couplings.
No. 141,830. Patented August 12, 1873.
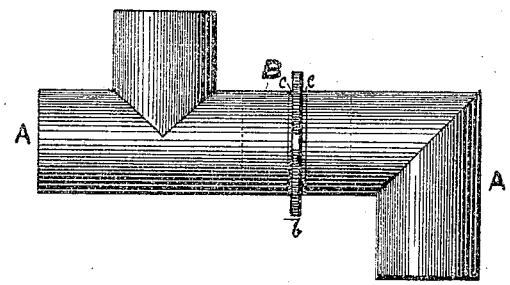
Fig. 1.
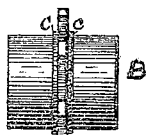
Fig. 2.
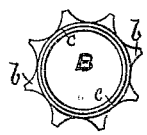 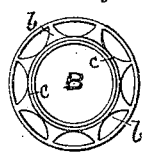
Fig. 3.  Fig. 4.

UNITED STATES PATENT OFFICE.

ALBERT C. SWEETLAND, OF NORTH ATTLEBOROUGH, MASSACHUSETTS.

IMPROVEMENT IN PIPE-COUPLINGS.

Specification forming part of Letters Patent No. 141,830, dated August 12, 1873; application filed July 23, 1873.

*To all whom it may concern:*

Be it known that I, ALBERT C. SWEETLAND, of North Attleborough, in the county of Bristol and State of Massachusetts, have invented certain new and useful Improvements in Pipe-Couplings or Slip-Joints for Metallic Pipes; and I do hereby declare the following to be a full, clear, and exact description of the invention, such as will enable others skilled in the art to which it pertains to make and use it, reference being had to the accompanying drawings, which form part of this specification.

My invention relates to improvements in the method of coupling metallic pipes. The invention consists in providing a joint-piece upon which the sections of any metallic pipe may be slipped to form connections, and from which they may be withdrawn or disconnected, when desired, without injury to their ends, and by means of which the necessity for casting the pipes with sockets is obviated, pipe sections of the same diameter throughout their entire length being used with my improved coupling.

In the accompanying drawing, Figure 1 is an elevation of two sections of pipe united by my improved coupling. Fig. 2 is a detached view of the coupling or slip-joint piece. Fig. 3 is a plan view of the same. Fig. 4 is a plan view of a modified form of the coupling.

A represents the pipe sections; B, the coupling, having a centrally-projecting hub or disk, $b$, which may be entirely solid or scalloped, as shown in the drawing, and the scallop points may be connected with a ring, as shown in Fig. 4 of the drawing. $c\ c$ are beads or annular projections formed one on each side of and close up to the hub $b$.

To connect sections of pipe with my improved coupling, one end of the slip-joint is inserted in the end of the pipe and then forced inward by tapping or hammering on the disk or points of the disk $b$ until the end of the pipe comes in contact with the bead $c$, the points of the disk enabling the operator to turn the slip-joint as it enters the pipe, and thereby form a closer connection. In this way the end of the pipe and the bead make a perfect joint without the pipe coming in contact with the disk or hub $b$, and the point of connection being plainly in view of the workman he can see to perfect the joint better than if it were at or close up to the shoulder of the hub or disk. The bead also makes a better finish, and leaves room for the tools when it becomes necessary to disconnect the pipes. The other end of the pipe may then be provided with a slip-joint in the same way, and another section of pipe be connected to the first by inserting therein the other end of either of the slip-joints and tapping or hammering in the manner before described.

When it becomes necessary to disconnect the pipes, it is accomplished by tapping or hammering on the hubs or disks in the opposite direction, and in this way the section of any metallic pipe can be readily united and disconnected without injury to their ends, all the force used being brought to bear on the hub or disk of the slip-joint instead of on the ends of the pipes.

The device shown by Fig. 4, having the ring connecting the points of the hub, is used in preference to the others, as the ring protects the points and makes them stronger; but the device may be used without the ring, if desired, the points being otherwise made of sufficient strength.

What I claim as my invention is—

A slip-joint coupling for connecting the sections of any metallic pipe, constructed with the hub or disk $b$ and beads $c\ c$, substantially as set forth.

In testimony that I claim the foregoing I have hereunto set my hand this 10th day of July, 1873.

ALBERT C. SWEETLAND.

Witnesses:
J. G. FALES,
JOHN N. THOMSON.